(12) United States Patent
Parida et al.

(10) Patent No.: US 12,512,741 B2
(45) Date of Patent: Dec. 30, 2025

(54) ENERGY HARVESTER AND METHOD OF HARVESTING ENERGY

(71) Applicant: Nanyang Technological University, Singapore (SG)

(72) Inventors: Kaushik Parida, Singapore (SG); Pooi See Lee, Singapore (SG)

(73) Assignee: Nanyang Technological University, Singapore (SG)

( * ) Notice: Subject to any disclaimer, the term of this patent is extended or adjusted under 35 U.S.C. 154(b) by 806 days.

(21) Appl. No.: 17/799,722

(22) PCT Filed: Feb. 17, 2021

(86) PCT No.: PCT/SG2021/050077
§ 371 (c)(1),
(2) Date: Aug. 15, 2022

(87) PCT Pub. No.: WO2021/167532
PCT Pub. Date: Aug. 26, 2021

(65) Prior Publication Data
US 2022/0407401 A1    Dec. 22, 2022

(30) Foreign Application Priority Data

Feb. 17, 2020    (SG) ........................ 10202001413Q

(51) Int. Cl.
*H02K 35/02*    (2006.01)
*H02N 1/04*    (2006.01)
*H02N 2/18*    (2006.01)
*H04R 17/00*    (2006.01)

(52) U.S. Cl.
CPC ............... *H02K 35/02* (2013.01); *H02N 1/04* (2013.01); *H02N 2/186* (2013.01); *H04R 17/00* (2013.01)

(58) Field of Classification Search
CPC .......... H02K 35/02; H02N 2/186; H02N 2/18; H04R 17/00
See application file for complete search history.

(56) References Cited

U.S. PATENT DOCUMENTS 10,855,205 B2 * 12/2020 Johnson .................... H02N 1/10
10,958,192 B2 * 3/2021 Joye ....................... F03G 7/0614
11,552,579 B2 * 1/2023 Toshiyoshi ............... H01G 7/02
(Continued)

FOREIGN PATENT DOCUMENTS

CN    110557045 A    12/2019
CN    115088179 A  *  9/2022    ............. H02N 2/186
(Continued)

OTHER PUBLICATIONS

Written Opinion of the International Searching Authority mailed Apr. 13, 2021 for PCT/SG2021/050077 filed Feb. 17, 2021; pp. 6.
(Continued)

*Primary Examiner* — Pedro J Cuevas
(74) *Attorney, Agent, or Firm* — Hoffman Warnick LLC

(57) ABSTRACT

An energy harvester having an electromagnet and a triboelectric nanogenerator. The triboelectric nanogenerator has triboelectric layers configured to be spaced apart by a gap width. Displacement of a magnet of the electromagnet is configured to enable the triboelectric layers to contact one another, in which the gap width is configured to be smaller than the displacement.

20 Claims, 12 Drawing Sheets

(56) References Cited

U.S. PATENT DOCUMENTS

| | | | | |
|---|---|---|---|---|
| 11,738,647 | B2* | 8/2023 | In | F03D 3/04 |
| | | | | 180/2.2 |
| 11,929,692 | B2* | 3/2024 | Rix | H02K 35/02 |
| 12,103,434 | B2* | 10/2024 | In | F03D 3/002 |
| 2018/0091064 | A1* | 3/2018 | Johnson | H02N 1/10 |
| 2018/0287512 | A1* | 10/2018 | Joye | H02N 1/04 |
| 2018/0355840 | A1* | 12/2018 | Hsu | F03D 5/00 |
| 2020/0070664 | A1* | 3/2020 | In | F03D 9/32 |
| 2023/0101355 | A1* | 3/2023 | In | F03D 3/002 |
| | | | | 180/2.2 |
| 2023/0391203 | A1* | 12/2023 | In | F03D 9/11 |

FOREIGN PATENT DOCUMENTS

| | | | | |
|---|---|---|---|---|
| JP | 2011166894 | A | * 8/2011 | |
| JP | 2018088780 | A | * 6/2018 | H02N 2/188 |
| KR | 20110065241 | A | * 6/2011 | H10N 30/50 |
| KR | 20140020200 | A | * 2/2014 | H10N 30/30 |
| KR | 20160074068 | A | * 6/2016 | H02N 2/183 |
| KR | 20160128045 | A | * 11/2016 | H02K 35/02 |
| WO | WO-2021167532 | A1 | * 8/2021 | H02N 2/186 |

OTHER PUBLICATIONS

International Search Report mailed Apr. 13, 2021 for PCT/SG2021/050077 filed Feb. 17, 2021; pp. 4.

He, X. et al.; "A low-frequency piezoelectric-electromagnetic-triboelectric hybrid broadband vibration energy harvester"; Nan Energy; Aug. 17, 2017; vol. 40; pp. 300-307.

Wang, X. et al.; "Effective energy storage from a hybridized electromagnetic-triboelectric nanogenerator"; Nano Energy; Dec. 9, 2016; vol. 32; pp. 36-41.

Gupta, R. K. et al.; "Broadband Energy Harvester Using Non-linear Polymer Spring and Electromagnetic/Triboelectric Hybrid Mechanism"; Scientific Reports; Jan. 25, 2017; vol. 7; pp. 13.

Salauddin, M. et al.; "Design and experiment of hybridized electromagnetic-triboelectric energy harvester using Halbach magnet array from handshaking vibration"; Energy Conversion and Management; Oct. 9, 2017; vol. 153; pp. 1-11.

Liu, H. et al.; "Study of a Hybrid Generator Based on Triboelectric and Electromagnetic Mechanisms"; IEEE Sensors Journal; Apr. 14, 2017; vol. 17; No. 12; pp. 3853-3860.

Quan, Ting et al. "Hybrid electromagnetic-triboelectric nanogenerator for harvesting vibration energy"; Nano Research 2015; 8(10); pp. 3272-3280.

* cited by examiner

VIEW A-A

VIEW B-B

VIEW C1-C1 / VIEW C2-C2

VIEW D-D

ENERGY HARVESTER AND METHOD OF HARVESTING ENERGY

TECHNICAL FIELD

The present disclosure relates to the field of energy harvesting, in particular, to an energy harvester and a method of harvesting energy.

BACKGROUND

While mechanical energy has emerged as a potential energy source, several challenges remain to be surmounted. For example, mechanical vibrations resulting from daily human activities typically produce too little electrical energy to be of practical use.

SUMMARY

In one aspect, the present disclosure provides an energy harvester including an electromagnet and a triboelectric nanogenerator. The electromagnet includes a magnet and a coil, and is configured to enable relative motion between the magnet and the coil. The triboelectric nanogenerator is coupled to the electromagnet. The triboelectric nanogenerator has a first member and a second member, in which the first member and the second member are configured to be spaced apart by a gap width. The gap width is smaller than a displacement of the magnet, in which the displacement enables at least a part of the first member to contact at least a part of the second member.

Optionally, the relative motion includes a reciprocating motion along a longitudinal axis, enabling the magnet to push the first member towards contacting the second member, and alternately enabling the magnet to separate from the first member. Optionally, the energy harvester includes a housing, the housing being fixed to the coil and resiliently coupled to the magnet to provide relative motion in response to movement of the housing. Optionally, the energy harvester includes a biasing member, in which the magnet is resiliently coupled to the housing via the biasing member, the biasing member being configured to primarily deform elastically along a longitudinal axis, and in which the magnet is oriented with its magnetic axis substantially parallel to the longitudinal axis. Optionally, a portion of the first member and a portion of the second member are coupled to one another such that the portion of the first member and the portion of the second member are substantially stationary relative to the housing. The energy harvester may further include a separator disposed between the first member and the second member, in which the gap width is defined by a thickness of the separator. Optionally, the first member includes a first triboelectric layer having a first peripheral portion substantially circumscribing a first central portion, in which the first central portion is resiliently displaceable relative to the first peripheral portion to enable an area of contact between at least a part of the first central portion and the at least a part of the second member. The second member may include a second triboelectric layer, in which the second triboelectric layer has a second peripheral portion substantially circumscribing a second central portion, and wherein the second central portion is resiliently displaceable relative to the second peripheral portion. The energy harvester may further include a separator disposed between the first peripheral portion and the second member, in which the gap width is defined by a thickness of the separator. Optionally, the energy harvester includes a separator coupling the first peripheral portion with the second member, such that the first peripheral portion and the second member are separated by the gap width. Optionally, the energy harvester further includes a first conductive layer coupled to the first triboelectric layer, in which the area of contact is substantially dependent on an area of the first conductive layer contiguous with the first central portion. Optionally, the area of contact is smaller than or substantially equal to the area of the first conductive layer.

Optionally, the energy harvester further includes a charge pump coupled to the triboelectric nanogenerator, in which the charge pump is configured to contribute to a charge density of at least one of the first member and the second member. The charge pump may be configured to deliver a unidirectional flow of charges to at least one of the first member and the second member. Optionally, the charge pump includes a piezoelectric element, the piezoelectric element being disposed proximal the second member, such that the piezoelectric element is configured to contribute charges in response to pressure resulting from contact between the first member and the second member. The second member may be configured to apply pressure on the piezoelectric element. The energy harvester may be configured to provide an electrical output, in which the electrical output includes a contribution from the triboelectric nanogenerator and a contribution from the electromagnet respectively. The energy harvester may be configured to provide an electrical output, in which a contribution from the triboelectric nanogenerator includes a contribution from the charge pump. Optionally, the coil is wound about a longitudinal axis, the coil having a solenoid length at least substantially equal to the displacement of the magnet along the longitudinal axis. The coil may be electrically connected to the first member and the second member respectively such that the electromagnet and the triboelectric nanogenerator are electrically connected in parallel. Alternatively, coil may be electrically connected to the first member and the second member respectively such that the electromagnet and the triboelectric nanogenerator are electrically connected in series.

In another aspect, there is an energy harvester in which a first triboelectric layer and a second triboelectric layer are configured to have opposite polarities. The first triboelectric layer and the second triboelectric layer are spaced apart by a gap width. The energy harvester includes an electromagnet with a magnet displaceable over a distance longer than the gap width, in which the magnet is configured to deform the first triboelectric layer such that at least a part of the first triboelectric layer contacts at least a part of the second triboelectric layer. Optionally, the electromagnet further includes a biasing member coupled to the magnet, in which the biasing member is configured to separate the magnet from the first triboelectric layer. Optionally, the magnet is displaceable in a reciprocating motion such that the magnet is configured to alternately deform the first triboelectric layer and separate from the first triboelectric layer.

In a further aspect, the present disclosure provides a portable power bank having an energy harvester and an energy storage device electrically connected to the energy harvester, such that the energy storage device is chargeable by electrical output from the energy harvester. The energy harvester is configured to convert movement of the portable power bank into the electrical output.

According to yet another aspect, a wearable product includes a wearable component, an energy harvester, and an electronic device. The energy harvester is coupled to the wearable component. The magnet is displaceable in response to movement of the wearable component such that movement of the wearable component is converted into an electrical output of the energy harvester. The electronic device is operable by drawing on the electrical output of the energy harvester.

The present disclosure includes a method of harvesting energy from motion of a body, the method including obtaining an electrical output from an energy harvester according to any of the embodiments disclosed herein. The electrical output includes a contribution from the electromagnet and a contribution from the triboelectric nanogenerator coupled with the electromagnet. The energy harvester is configured to be wearable by the body such that relative motion between the magnet and the coil is energized by the motion of the body. Optionally, the method further includes operating an electronic device using the electrical output, the electronic device being electrically connected to the energy harvester. Optionally, the method includes charging an energy storage device using the electrical output, in which the energy storage device is electrically connected to the energy harvester. Optionally, the method includes operating an electronic device using the electrical output from the energy harvester, the electronic device being electrically connected to one or both of the energy harvester and the energy storage device.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Figure 1:
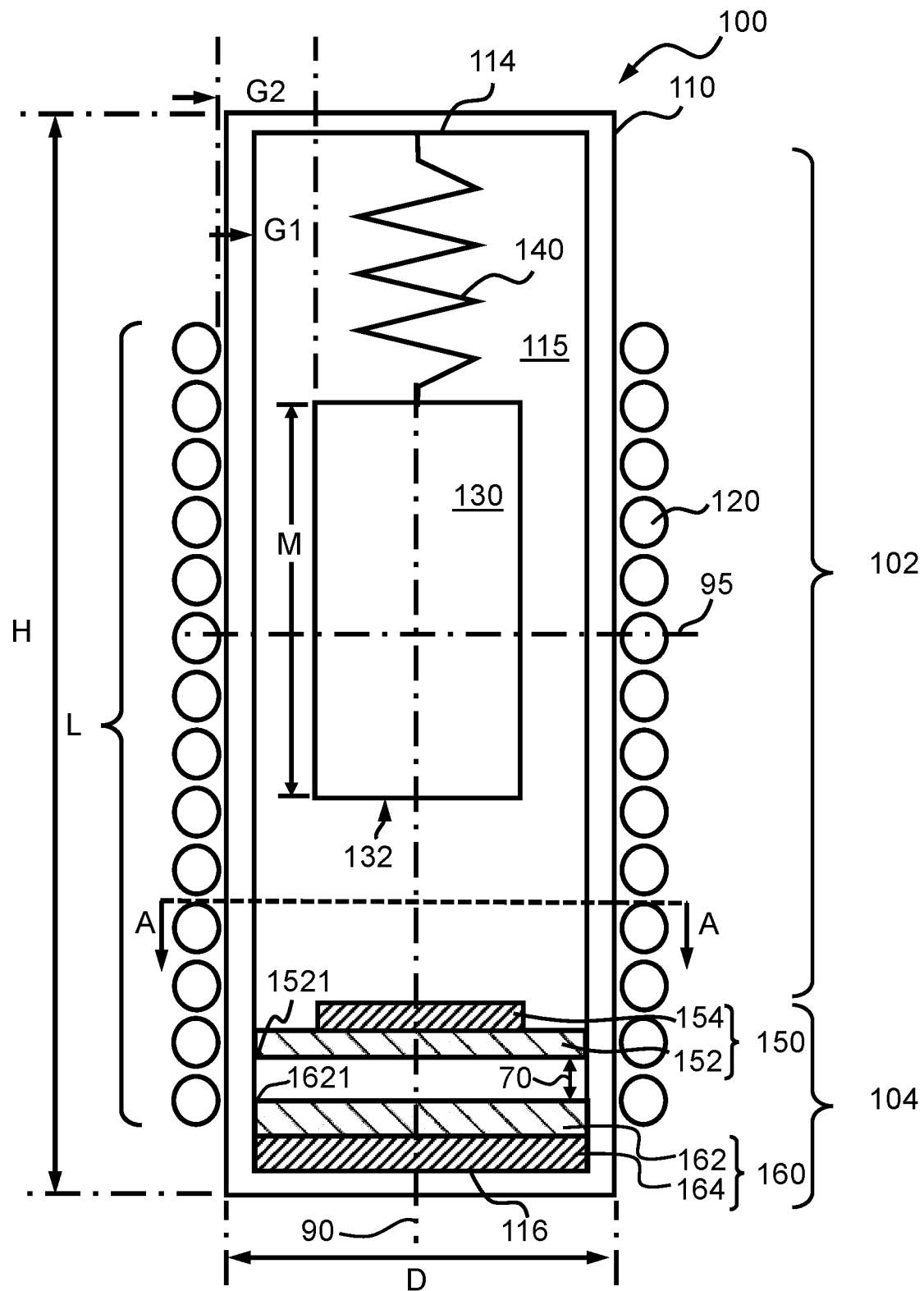
FIG. 1 is a schematic diagram of an energy harvester according to one embodiment of the present disclosure.

FIG. 1 schematically illustrates an energy harvester (100) with a triboelectric nanogenerator (104). The triboelectric nanogenerator (104) includes a first member (150) and a second member (160), the first member and the second member are configured to have opposite polarities. The first member may be configured with a first triboelectric layer (152) connected to a first conductive layer (154). The second member may be configured as a second triboelectric layer (162) connected to a second conductive layer (164). The first triboelectric layer (152) and the second triboelectric layer (162) are configured to have opposite polarities. The first triboelectric layer (152) and the second triboelectric layer (162) are oriented to present major surfaces substantially opposing one another, in which the major surfaces are configured to have opposite polarities. The triboelectric nanogenerator (104) is configured such that at least a portion of the first triboelectric layer (152) and at least a portion of the second triboelectric layer (162) are spaced apart in a longitudinal direction (90).

In one example, each of the first member (150) and the second member (160) are disposed in a housing (110) and substantially aligned in the longitudinal direction (substantially parallel to a longitudinal axis, 90). The first triboelectric layer (152) presents a major surface substantially opposing a major surface presented by the second triboelectric layer (162), with the major surfaces substantially normal to the longitudinal axis. The first triboelectric layer (152) and the second triboelectric layer (162) are separately joined to the housing (110) at their edges, with their edges spaced apart by a gap width (70). A first peripheral portion (1521, FIG. 3) of the first triboelectric layer (152) and a second peripheral portion (1621) of the second triboelectric layer (162) are thus always a gap width apart from one another in the longitudinal direction. This provides that a portion of the first member (150) and a portion of the second member (160) are coupled to one another (in this case, via the housing) such that the portion of the first member (150) and the portion of the second member (160) are substantially stationary relative to the housing (110).

In another example, a part of the housing (110) is sized to receive the first member (150) and the second member (160) such that the first member (150) and the second member (160) disposed therein are substantially able to move in the longitudinal direction (90) while being relatively constrained from moving laterally. Lateral movement refers to movement in a plane substantially normal to the longitudinal direction.

Figures 2A, 2B:
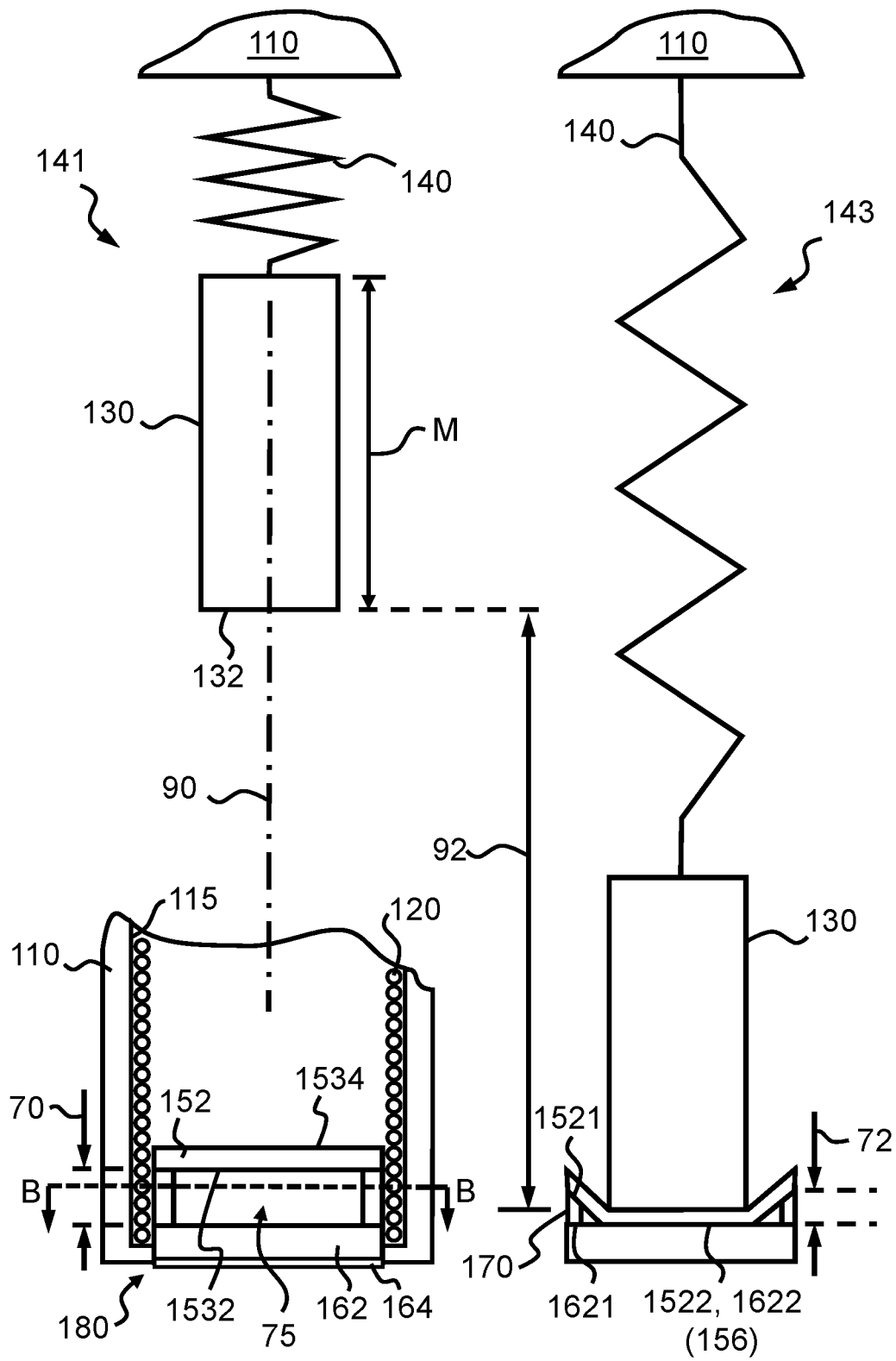
FIG. 2A and FIG. 2B are partial schematic illustrations of different states of the energy harvester according to another embodiment.
Figure 3:
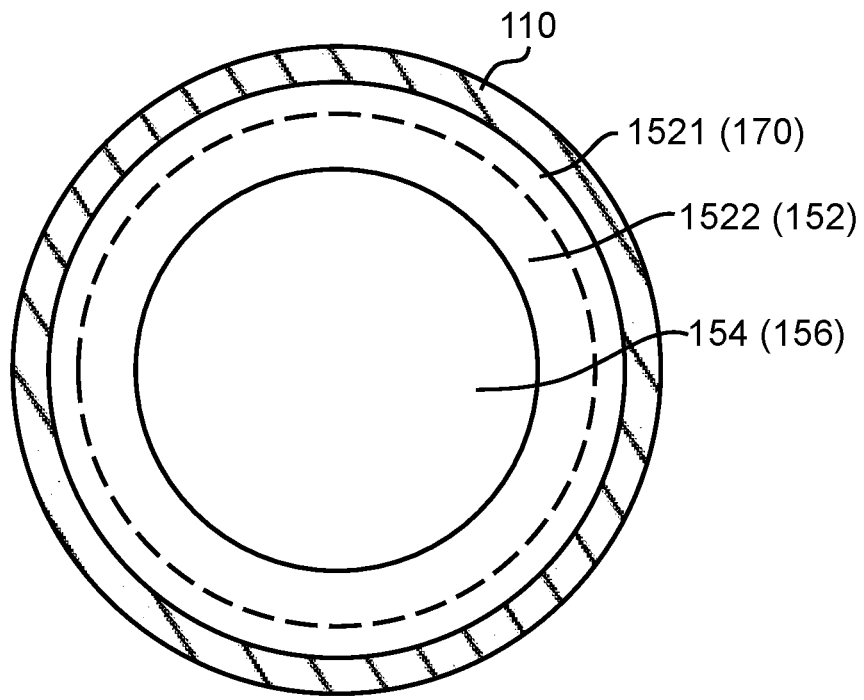
FIG. 3 is a cross-section of the energy harvester of FIG. 1 viewed along line A-A.
Figure 4:
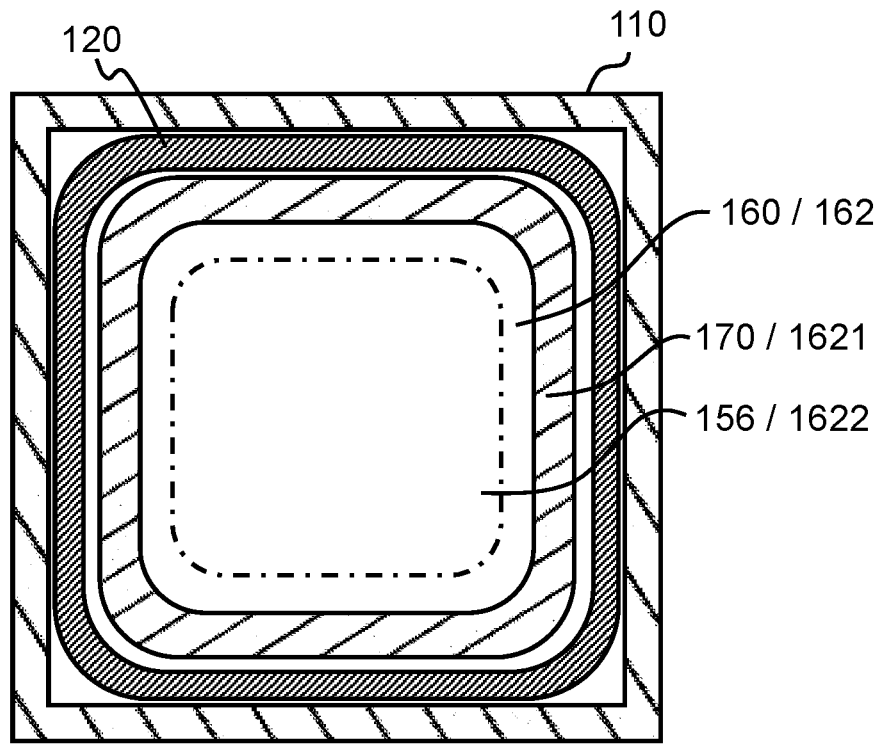
FIG. 4 is a cross-section of the energy harvester of FIG. 2A viewed along line B-B.

As shown in FIG. 2A, in another embodiment, a separator (170) is disposed between a portion of the first triboelectric layer (152) and a portion of the second triboelectric layer (162) such that the portion of the first triboelectric layer (152) and the portion of the second triboelectric layer (162) are kept separated. The separator (170) may be shaped to contact the first triboelectric layer (152) at the first peripheral portion (1521) and to contact the second triboelectric layer (162) at the second peripheral portion (1621), leaving an air gap (75) between a first central portion (1522) of the first triboelectric layer (152) and a second central portion (1622) of the second triboelectric layer (162). The housing (110) need not be cylindrical in shape. For example, as shown in FIG. 4, the first member (150) and the second member (160) may be disposed in a channel (115) of the housing (110) with a non-cylindrical cross-section. The separator (170) sandwiched between the first triboelectric layer (152) and the second triboelectric layer (162) may be of various shapes. For example, FIG. 3 shows a separator (170) that is circular in shape, such as an O-ring. In the example of FIG. 4, the separator (170) is not circular in shape. As a non-limiting example, the separator may generally correspond in shape to a perimeter of the first member (150) or the second member (160), or to a perimeter of the first triboelectric layer (152) or the second triboelectric layer (162). The separator (170) may be elastic or resiliently compressible, or the separator (170) may be relatively inelastic relative to the first triboelectric layer (152). The separator (170) may be made of an elastic material (such as rubber) or a relatively inelastic and electrically non-conducting material. In a default state or in an uncompressed state, a thickness of the separator defines the gap width (70) or the largest possible separation between the first triboelectric layer (152) and the second triboelectric layer (162). The gap width (70) is also the largest possible separation between the first member (150) and the second member (160). In the course of the first triboelectric layer (152) undergoing deformation to contact the second triboelectric layer (162), the separator (170) may be compressed such that longitudinal spacing (72) between the first triboelectric layer (152) and the second triboelectric layer (162) is smaller than the gap width (70). The separator (170) helps to hold the relative position between the first peripheral portion (1521) and the second member (160).

In some examples, instead of being fixed to a part of the housing (110) or instead of resting on the separator, a portion of the first triboelectric layer (152) may be joined with the separator (170) by an adhesive. The separator (170) may be further joined to a portion of the second triboelectric layer (162) by an adhesive. In one example, the separator (170) may be provided with an adhesive tape suitably disposed to secure the separator to the first triboelectric layer (152) and the second triboelectric layer (162). The separator (170) may alternatively be mechanically or otherwise coupled to the first member (150) and the second member (160) respectively, with the first triboelectric layer (152) and the second triboelectric layer (162) spaced apart and substantially opposing one another. In the embodiment where the second member is fixed to the housing (110), a portion of the first member (150) and a portion of the second member (160) are thus coupled to one another (in this case, via the separator) such that the portion of the first member (150) and the portion of the second member (160) are substantially stationary relative to the housing (110). In some examples, the first member (152), the second member (162), and the separator (170) may be provided together as a modular unit (180).

The first triboelectric layer (152) is configured as a resiliently deformable member, such that at least a part of the first triboelectric layer (152) can be deformed to alternately come into contact with and separate from at least a part of the second triboelectric layer (162). The second triboelectric layer (162) may be configured as a resiliently deformable member, or in some examples, the second triboelectric layer (162) may be configured as a relatively rigid member. The first triboelectric layer (152) and the second triboelectric layer (162) are configured to be of opposite polarities, such that opposite charges are formed on separation of the first triboelectric layer (152) and the second triboelectric layer (162). Examples of materials suitable for use as either one of the first triboelectric layer (152) and the second triboelectric layer (162) include, but are not limited to, the following: polyethylene terephthalate (PET), polyvinylidene fluoride (PVDF), polyimide (PI), polydimethylsiloxane (PDMS), polymethyl methacrylate (PMMA), aluminum, copper, etc. Different configurations of the triboelectric nanogenerator (104) of the present disclosure may be configured by selecting different materials for the first triboelectric layer (152) and the second triboelectric layer (162). Preferably, the material selected for the first triboelectric layer (152) is different from the material selected for the second triboelectric layer (162). In some examples, the first triboelectric layer (152) and the second triboelectric layer (162) are respectively configured with different materials such that the first triboelectric layer and the second triboelectric layer are characterised by a relative triboelectric polarity difference greater than a threshold value. In some examples, the first triboelectric layer (152) and the second triboelectric layer (162) are selected from different materials (including but not limited to the examples given above), in which the first triboelectric layer (152) is characterized by a modulus of elasticity sufficient for it to be deformed and close the gap width (70) to contact the second triboelectric layer (162). As mentioned, in some examples, the second triboelectric layer (162) is configured as a resiliently deformable member. It can be appreciated that the longitudinal spacing (72) between the first triboelectric layer (152) and the second triboelectric layer (162) may be described as a variable spacing, that is, the longitudinal spacing between different parts of the first triboelectric layer (152) and corresponding parts of the second triboelectric layer (162) may vary at different parts of the major surfaces and at different times. As shown in FIG. 2B, even when at least one part of the first triboelectric layer (152) and at least one part of the second triboelectric layer (162) are in direct contact, there remains at least another portion of the first triboelectric layer (152) that is spaced apart from the second triboelectric layer (162). For example, even when the first triboelectric layer (152) and the second triboelectric layer (162) are in direct contact at least at a part of their respective central portions (1522, 1622), at least a part of their respective peripheral portions (1521, 1621) remain spaced apart from one another. The gap width (70), being defined as the largest possible longitudinal spacing, is relatively constant for a specific energy harvester configuration.

As shown in FIG. 3, the first triboelectric layer (152) may be described in terms of a first peripheral portion (1521) and a first central portion (1522), in which the first peripheral portion (1521) substantially circumscribes the first central portion (1522). Similarly, in some embodiments, as shown in FIG. 4, the second triboelectric layer (162) may be described in terms of a second peripheral portion (1621) substantially circumscribing a second central portion (1622). It will be understood that the terms "central portion" and "peripheral portion" are used in this document merely for convenient reference, and that each of the first triboelectric layer (152) and the second triboelectric layer (162) may be formed as a unitary or integral piece of material with no visible distinction or distinct boundary between the peripheral portion and the central portion. The first peripheral portion (1521) may be kept spaced apart from the second triboelectric member (160) by any one of the exemplary configurations described above, while the first central portion (1522) is configured to be resiliently displaceable relative to the first peripheral portion (1521) to provide or to enable an area of contact (156) between the first central portion (1522) and at least a part of the second triboelectric layer (162), that is, between at least a part of the first member (150) and at least a part of the second member (160). For example, the first peripheral portion (1521) and the second member (160) may be separated by the gap width, by a separator (170) coupling the first peripheral portion (1521) with the second member (160). The area of contact (156) refers to the area where the first triboelectric layer (152) and the second triboelectric layer (162) come into direct physical contact with one another. The area of contact (156) may also be described as the area where the first member (150) can be brought into direct physical contact with the second member (160) to generate charges through a triboelectric effect. The larger the area of contact, the more charges are expected to be generated when two triboelectric materials of opposite polarities separate from one another. Embodiments of the present disclosure are thus counter-intuitively configured in that a viable level of efficiency in energy harvesting is achievable while not requiring the whole of the first triboelectric layer (152) to contact the whole of the second triboelectric layer (162). In other words, according to embodiments of the present disclosure, the area of contact (156) is enabled by at least a part of the first triboelectric layer (152) coming into contact with at least a part of the second triboelectric layer (162). Alternatively described, according to embodiments of the present disclosure, the area of contact (156) is enabled by at least a part of the first member (150) coming into contact with at least a part of the second member (160). In some examples, the area of contact (156) is enabled by the first central portion (1522) coming into contact with the second central portion (1622).

In a conventional hybrid energy harvester, a triboelectric material is coated onto a flat surface of a magnet of an electromagnet, such that the triboelectric material is moved in tandem with the flat surface of the magnet at all times. The present disclosure departs from the conventional approach. According to embodiments of the present disclosure, the energy harvester (100) is configured such that the displacement (92) of the magnet (130) is independent of the gap width (70). The contact surface (132) of the magnet nearest to the first member (150) is not fixed to or in contact with the first member (150) at all times. As shown in FIG. 1 and FIG. 2A, at times, for example when the biasing member (140) is in a relatively compressed state, there is a clear separation between the magnet (130) and the first member (150). In the example of FIG. 2B, when the biasing member (140) is extended and the magnet (130) contacts the first member (150), the contact surface (132) of the magnet (130) first comes into direct physical contact with the first conductive layer (154). Depending on the size or area of the first conductive layer (154) relative to the area of contact surface (132), the contact surface (132) may or may not come into direct physical contact with the first triboelectric layer (152), during the intermittent times when the magnet (130) pushes against the first member (150) in the course of the displacement of the magnet (130). When the biasing member (140) draws the magnet (130) away from the first member (150), there is once again a clear separation of the magnet from the first member (150), including a clear separation from the first triboelectric layer (152). In other words, the biasing member (140) is configured to separate the magnet (130) from the first triboelectric layer (152). The magnet (130) is displaceable in the reciprocating motion such that the magnet (130) is configured to alternately deform the first triboelectric layer (152) and separate from the first triboelectric layer (152). Alternatively described, the biasing member (140) is configured to separate the magnet (130) from the first member (150), the first triboelectric layer (152) being disposed on the first member (150). The magnet is displaceable in the reciprocating motion such that the magnet (130) is configured to alternately deform the first triboelectric layer (152) and separate the from the first member (150).

Even in examples where the first conductive layer (154) is differently configured such that the contact surface (132) can come into direct physical contact with the first triboelectric layer (152), the magnet (130) and the first triboelectric layer (152) are configured to be longitudinally spaced apart for over half of the displacement (92, FIG. 2A) traversed by the magnet in its reciprocating motion. In some prototypes, the energy harvester is configured to a displacement (92) that is about 10 ten times the gap width (70). In some examples, when the energy harvester in a non-operating state, the magnet (130) at rest is separated from the first member (150).

Figure 7:
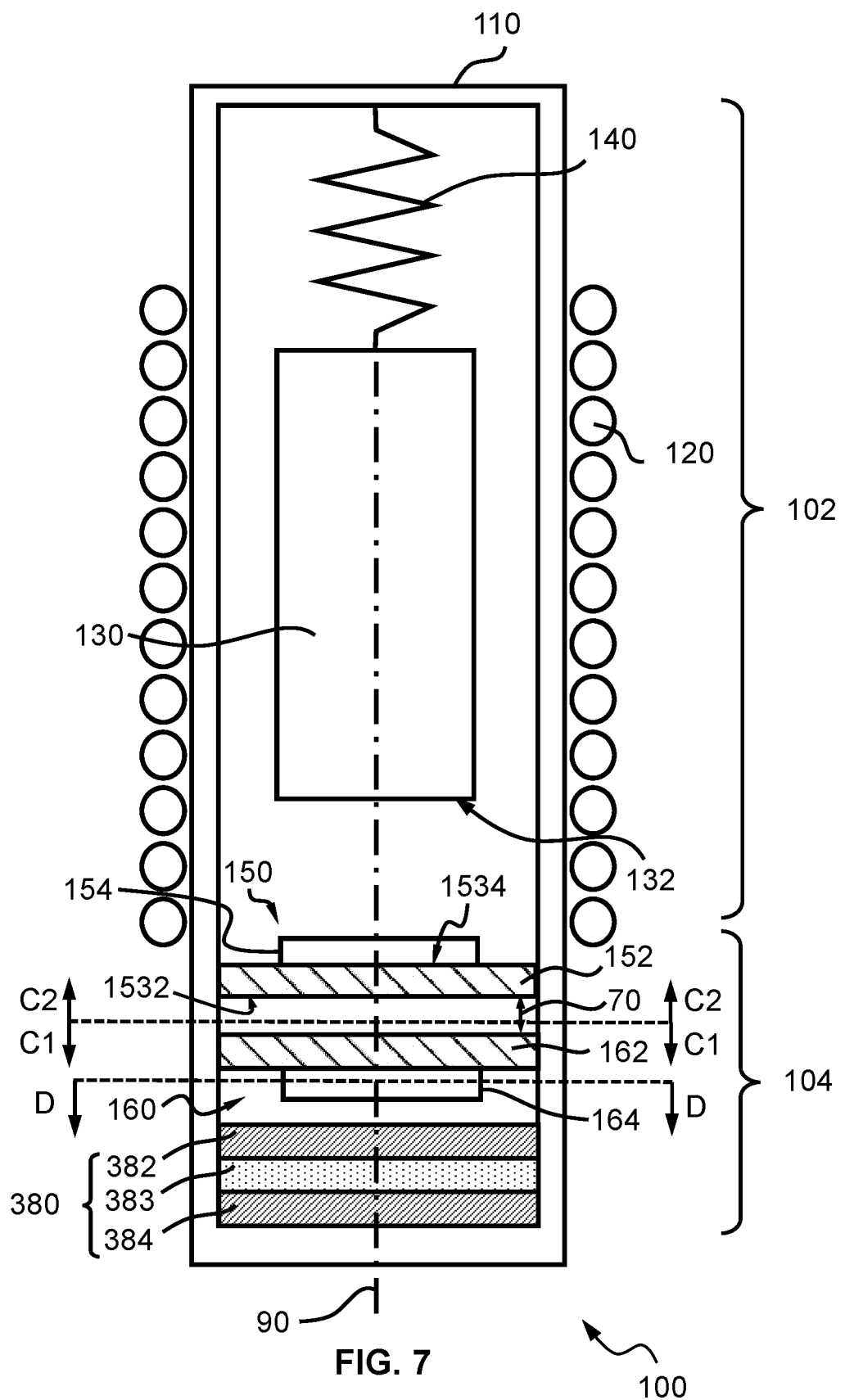
FIG. 7 is a schematic diagram of an energy harvester according to another embodiment.

As an example, the first triboelectric layer (152) may be in the form of an elastic film, allowing the first central portion (1522) to resiliently displace relative to the first peripheral portion (1521). In some examples, the first triboelectric layer (152) includes one major surface (1534) contiguous with the first conductive layer (154) and another substantially opposing major surface (1532) that is presented to air, as shown in FIG. 1 and FIG. 7. In some examples, the first triboelectric layer (152) may be provided as a solid piece of material capable of presenting two substantially opposing major surfaces (1532, 1534) to air, as shown in FIG. 2A. The first triboelectric layer (152) is capable of being supported at its peripheral portion (1521) so as to present a central portion (1522) substantially free to deform. Merely as examples, the first triboelectric layer (152) and the second triboelectric layer (162) are shown in FIG. 1 and FIG. 2A with substantially uniform thickness and flat profiles, and in FIG. 3 as having a circular shape. The second triboelectric layer (162) in FIG. 4 shows an example of an alternative shape, such as a polygonal shape. In this embodiment, the second triboelectric layer (162) are configured as a four-sided shape. In some other examples, the first triboelectric layer (152) and the second triboelectric layer (162) may be configured with other shapes, thicknesses, and/or profiles. The first triboelectric layer (152) and the second triboelectric layer (162) of one energy harvester (100) may be configured to have similar or different shapes, thicknesses, and/or profiles. In some example, the first member (150) includes a resiliently deformable triboelectric material (152) in the form of a film, with a first conductive layer (154) coupled thereto. The second member (160) may include a resiliently deformable triboelectric material (162) in the form of a film or in the form of a more rigid plate, with a second conductive layer (164) coupled thereto. Alternatively, the second member (160) may include triboelectric materials in the form of a coating supported by the housing (110), the second conductive layer (164), or another component (such as 380, FIG. 7).

Various embodiments of the triboelectric nanogenerator (104) as described above may be configured as part of an energy harvester. In particular, various embodiments of the triboelectric nanogenerator (104) are suitable for integration with electromagnets to enable significantly improved energy harvesting performance. In some examples, the energy harvester includes a triboelectric nanogenerator (104) as described above, operably coupled with an electromagnet (102). The electromagnet in FIG. 1 illustrates an example in which a magnet and a coil are configured to convert kinetic energy into electrical energy, by enabling relative motion between the magnet and the coil. The energy harvester is further configured such that the relative motion between the magnet and the coil can be translated into resilient deformation or resilient displacement of at least a portion of the first triboelectric layer.

As illustrated in FIG. 1, the electromagnet (102) includes a magnet (130) and a coil (120). The coil (120) may be wound about the housing (110) such that the coil (120) is stationary relative to the housing (110), while the magnet (130) is resiliently coupled to the housing (110) such that the magnet (130) is displaceable relative to the housing (110) and the coil (120). As the magnet (130) is displaced relative to the coil (120), an electrical current is generated in the coil (120). The term "magnet" as used in the present disclosure refers to a component that has a magnetic field, a component that may be induced to provide a magnetic field, or a component that is otherwise configured generate a magnetic field. As non-limiting examples, the magnet may be a permanent magnet or a temporary magnet. Non-limiting examples of permanent magnets suitable for use here includes ferromagnets, niobium magnets, etc. Magnetic nanomaterials may alternatively be selected for use as the magnet. The magnet may include a secondary solenoid wound about a magnetizable core, that is, a secondary electromagnet may be used in place of a permanent magnet. The triboelectric nanogenerator (104) is coupled with the electromagnet (102) such that at least a portion of the first member (150) is elastically deformable by a displaceable component of the electromagnet (102). The stationary component is one of the magnet and the coil, in which case the displaceable component is the other of the magnet and the coil. In some examples, the magnet acts as the displaceable component. In some other examples where the magnet itself includes a secondary solenoid wound about a core, the secondary solenoid and the core together serve as the displaceable component.

The housing (110) may define an interior volume or a channel (115) suitable for receiving the magnet (130). The channel (115) may extend substantially longitudinally from a proximal end (114) to a distal end (116). The first member and the second member are disposed at the distal end (116). The magnet (140) may be resiliently coupled to the proximal end (114) via a biasing member (140). The biasing member (140) enables relative motion between the magnet (130) and the coil (120), for example, in response to movement of the housing (110) or in response to forces acting on the housing (110). In other words, the housing (110) and the coil (120) are fixed to each other, while the housing (110) is resiliently coupled with the magnet (130) to provide the relative motion (between the coil and the magnet) in response to movement of the housing (110). Examples of the biasing member (140) include but are not limited to coil springs which can be configured to primarily deform elastically along the longitudinal axis (90). The relative motion between the magnet (130) and the coil (120) may include a reciprocating motion along the longitudinal axis (90). The channel (115) is preferably configured with a longitudinal dimension that permits the reciprocating motion to occur relatively freely over a displacement (92). The longitudinal dimension of the channel (115) is configured such that in the course of displacement relative to the housing (110), the magnet (130) pushes against the first member (150) until the first triboelectric layer (152) and the second triboelectric layer (162) meet, that is, until the first member (150) and the second member (160) meet. Additionally, in some situations, the magnet (130) may experience a small lateral displacement along a transverse axis (95) substantially normal to the longitudinal axis (90). The magnet (130) may be oriented with its magnetic axis substantially parallel to the longitudinal axis (90). As shown in FIG. 1 and FIG. 2A, the energy harvester (100) may be configured with its length (M) substantially parallel to the longitudinal axis (90). In some examples, the coil (120) is wound into a solenoid having a solenoid length (L), in which the solenoid length (L) is substantially equal to or greater than the length of the magnet (M). As an example, the coil (120) is wound about the longitudinal axis (90) such that the coil 120 has a solenoid length (L) substantially equal or longer than the relative displacement (92) of the magnet (130) along the longitudinal axis (90). In some examples, the coil (120) extends to a position near the second member (160) as shown in FIG. 1. The coil (120) may be disposed outside the channel (115) as shown in FIG. 1 or in the channel (115) as shown in FIG. 2A.

The first member (150) and the second member (160) are configured to be spaced apart by a gap width (70), wherein the gap width (70) is smaller than a displacement (92) of the magnet (130). As an example, the ratio of the displacement of the magnet (130) to the gap width (70) can be as much as 10:1. The displacement of the magnet (130) enables at least a part of the first member (150) to contact the second member (160). The relative motion includes a reciprocating motion along a longitudinal axis, enabling the magnet (130) to push the first member (150) towards contacting the second member (160), and alternately enabling the magnet (130) to separate from the first member (150). With the first member (150) and the second member (160) coming into contact and separating from each other, electrical energy is generated via triboelectric effect.

FIG. 2A and FIG. 2B illustrate possible states of the energy harvester (100) according to another embodiment. In FIG. 2A, the energy harvester (100) is in a first state (141) in which the magnet (130) is not in abutment with the first member (150). FIG. 2B illustrates the energy harvester (100) in a second state (143), in which the magnet (130) is in abutment with the first member (150). In the second state, the magnet (130) may be moving substantially longitudinally towards the second member, causing the first member (150) to be displaced and to contact the second member (160). Once the biasing member (140) starts to pull the magnet away from the first member (150), the elastic nature of the first triboelectric layer (152) resiliently returns to its undeformed state, that is, the first triboelectric layer (152) separates from the second triboelectric layer (162). When the energy harvester (100) experiences a force or motion, the magnet (130) exhibits reciprocating motion along the longitudinal axis (90). The energy harvester may intermittently be in the first state or the second state. The force or the motion causes the magnet (130) to move relative to the coil (120) causing the electromagnet 102 to generate electrical energy. Concurrently, as the magnet (130) moves and displaces the first member (150) to contact the second member (160), charges built up along the area of contact between the first member (150) and the second member (160). With the eventual separation of the first member (150) from the second member (160), electrical energy is generated by the triboelectric nanogenerator (104). When subjected to a force or motion, the energy harvester (100) is configured to provide an electrical output which includes a contribution from the triboelectric nanogenerator (104) and a contribution from the electromagnet (102) respectively. The electrical output or electrical energy may be generated in a periodic manner in response to the displacement or the force.

The resilient nature of the first triboelectric layer (152) may contribute towards biasing the magnet (130) away from the first triboelectric layer (152). This may help the magnet (130) maintain reciprocating motion for a longer time, and enable more energy to be harvested.

Optionally, the second triboelectric layer (162) may also be configured to be resiliently deformable. The second central portion (1622) may be resiliently displaceable relative to the second peripheral portion (1621). The resilient nature of the first triboelectric layer (152) and second triboelectric layer (162) may help the magnet (130) maintain its reciprocating motion for a longer time, and enable more energy to be harvested.

A first electrical contact, such as a first conductive layer (154), is coupled to the first central portion (1522) of the first triboelectric layer (152). A second electrical contact, such as a second conductive layer (164), is coupled to the second central portion (1622) the second triboelectric layer (162). The area of contact (156) between the first central portion (1522) and the second member (160) may be substantially dependent on an area of the first conductive layer (154) contiguous with the first central portion (1522). This may be the case where the first conductive layer (154) is configured to be more stiff or rigid relative to the first triboelectric layer (152). Therefore, the area of the first conductive layer (154) determines the area of contact (156) between the first central portion (1522) and the second member (160). For example, the area of contact (156) may be smaller than or substantially equal to the area of the first conductive layer (154). Alternatively, the first conductive layer (154) may be configured to be a conductive film or tape which is relatively flexible. As an example, the first conductive layer (154) may be a metallic tape such as a copper tape. The area of contact (156) between the first central portion (1522) and the second member (160) is substantially dependent on a geometry of the magnet (130). For example, the area of contact depends on a contact surface (132) of the magnet (130) or a cross section of the magnet (130). Preferably, the first conductive layer (154) has an area that is substantially equal to or larger than the contact surface (132) of the magnet (130), so as to facilitate the formation of a larger area of contact (156) between the first triboelectric layer (152) and the second triboelectric layer (162).

As an option, the second conductive layer (164) may also be configured to be more stiff or rigid relative to the second triboelectric layer (162) such that the second conductive layer (164) is substantially fixed to the housing (110). Alternatively, the second conductive layer (164) may be configured to be a conductive film or tape such that it is resiliently displaceable relative to the housing (110).

Figure 5:
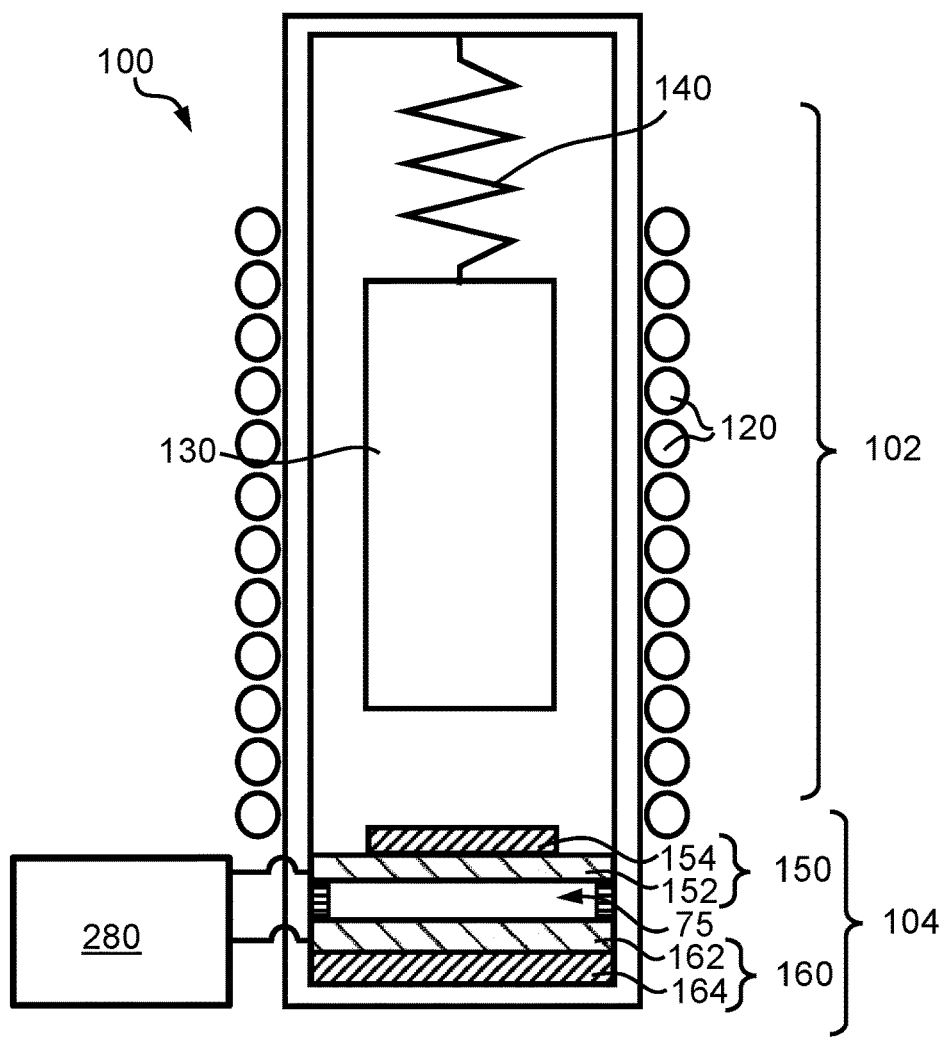
FIG. 5 is a schematic diagram of an energy harvester according to another embodiment of the present disclosure.
Figure 6:
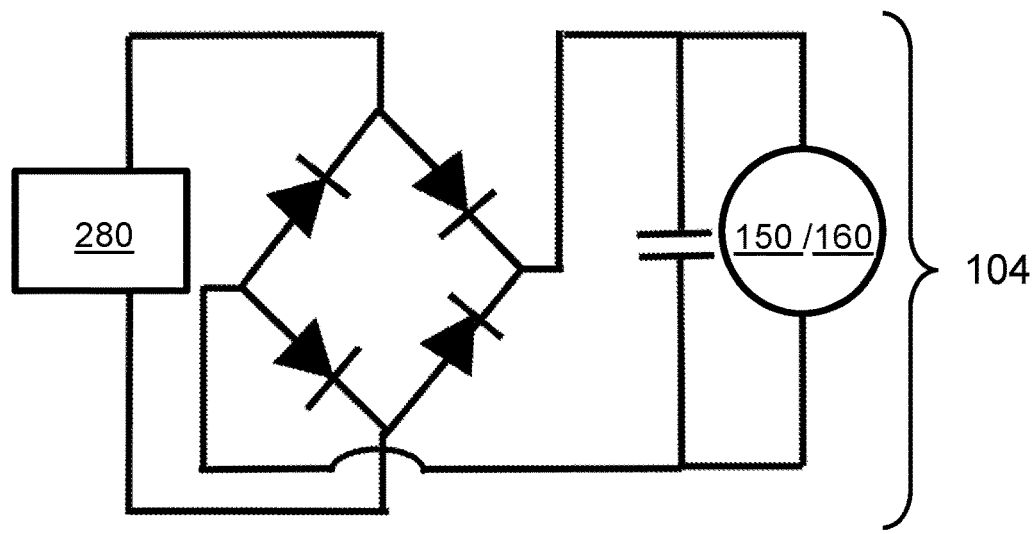
FIG. 6 is a partial schematic circuit of the embodiment of FIG. 5.

In another embodiment as shown in FIG. 5 and FIG. 6, the energy harvester (100) includes an electromagnet (102) and a triboelectric nanogenerator (104) coupled to the electromagnet (102). In this embodiment, the energy harvester (100) further includes a charge pump (280) coupled to the triboelectric nanogenerator (104). The electromagnet (102) comprises a magnet (130) displaceable relative to a coil (120), such that a relative motion between the magnet (130) and the coil (120) generates electrical energy. The triboelectric nanogenerator (104) comprises a first member (150) and a second member (160). The first member (150) and the second member (160) are being configured to be spaced apart by a gap width (70), wherein the gap width (70) is smaller than a displacement of the magnet (130). The displacement of the magnet (130) enables the magnet (130) to push the first member (150) towards contacting the second member (160), and alternately enabling the magnet (130) to separate from the first member (150). The charge pump (280) is configured to contribute a charge density to the triboelectric nanogenerator (104) during the course of operation of the energy harvester (100). During the course of operation, the charge pump (280) contributes to a charge density to at least one of the first member (150) and the second member (160).

As an option, with reference to FIG. 6, a rectifier circuit is provided between the charge pump (280) and first member (150) and the second member (160). For example, the charge pump (280) may be electrically connected to at least one of the first member (150) and the second member (160). The charge pump (280) is configured to deliver a unidirectional flow of charges to at least one of the first member (250) and the second member (260). A multiplying effect is achieved at the triboelectric nanogenerator (104). In other words, additional electrical charges are provided to the triboelectric nanogenerator (104) by the charge pump. The energy harvester (100) is configured to provide an electrical output which includes a contribution from the triboelectric nanogenerator (104) and a contribution from the electromagnet (102), in which the contribution from the triboelectric nanogenerator includes a contribution from the charge pump.

According to an embodiment shown in FIG. 7, the energy harvester (100) is configured with a charge pump that include a piezoelectric element (380). The energy harvester (100) includes an electromagnet (102) and a triboelectric nanogenerator (104) coupled to the electromagnet (102). The electromagnet (102) includes a magnet (130) displaceable relative to a coil (120), such that a relative motion between the magnet (130) and the coil (120) generates electrical energy. The triboelectric nanogenerator (104) includes a first member (150) and a second member (160). The first member (150) and the second member (160) are configured to be spaced apart by a gap width (70), in which the gap width (70) is smaller than a displacement of the magnet (130).

Figure 8:
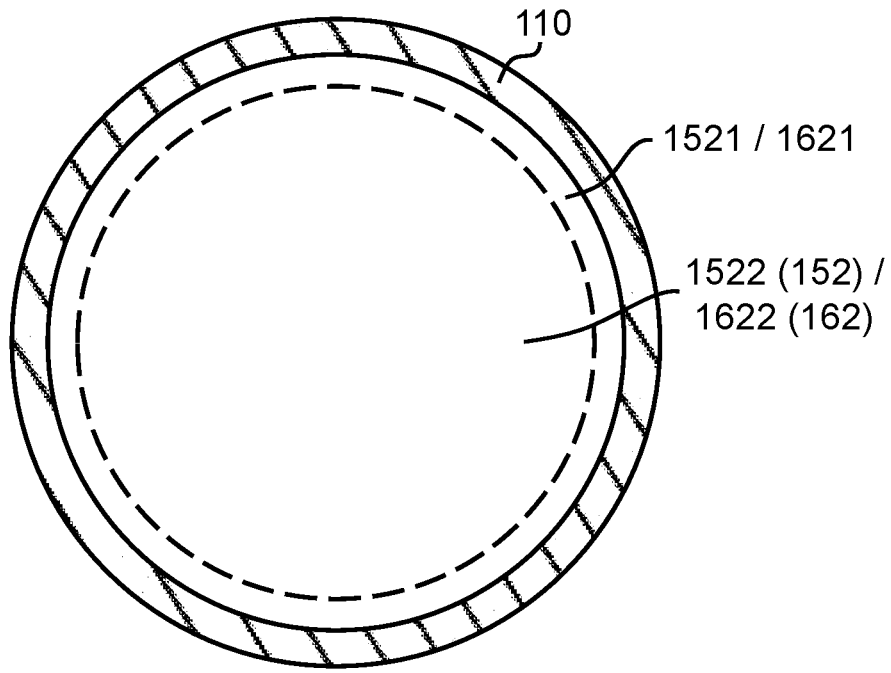
FIG. 8 is a cross-section of the energy harvester of FIG. 7 viewed along line C1-C1 and line C2-C2.

In this embodiment, the piezoelectric element (380) is configured as a charge pump capable of contributing to a charge density of at least one of the first member (150) and the second member (160). The piezoelectric element (380) may be disposed proximal to the second member (160). In this disclosure, the term "proximal" may mean adjacent and spaced apart, or adjacent and in abutment. The proximity between the piezoelectric element (380) and the second member (160) allows pressure to be applied on the piezoelectric element (380) via the second member (160). The piezoelectric element (380) is configured to contribute charges in response to pressure resulting from contact between the first member (150) and the second member (160). To facilitate the situation where pressure is applied on the piezoelectric element (380), both the first member (150) and the second member (160) may be resiliently deformable. For example, as illustrated by FIG. 8, the second member (160) may include a second central portion (1622) that is resiliently displaceable relative to the second peripheral portion (1621). When the magnet (130) in the reciprocating motion and intermittently pushes the first member (150) and the second member (160), the first member (150) and the second member (160) in turn apply pressure to the piezoelectric element (380). In such manner, the second member (160) may be configured to apply pressure on the piezoelectric element. The piezoelectric element may include electrodes (382, 384) with a piezoelectric ceramic (383) sandwiched therebetween.

As an example, the first member (150) includes a first triboelectric layer (152) and the second member (160) includes a second triboelectric layer (162). The first triboelectric layer (152) and the second triboelectric layer (162) are both configured as resilient members. The first triboelectric layer (152) includes a first peripheral portion (1521) substantially circumscribing a first central portion (1522). The first central portion (1522) is resiliently displaceable relative to the first peripheral portion (1521) to enable an area of contact (156) between the first central portion (1522) and the second triboelectric layer (162). The second central portion (1622) is resiliently displaceable relative to the second peripheral portion (1621). The second triboelectric layer (162) includes a second peripheral portion (1621) substantially circumscribing the second central portion (1622). The second central portion (1622) is resiliently displaceable relative to the second peripheral portion (1621). When an excitation is applied to the energy harvester (100), the magnet (130) displaces the first central portion (1522) to contact the second triboelectric layer (162). Upon contact, the second central portion (1622) of the second triboelectric layer (162) resiliently displaces relative to the second peripheral portion (1621).

Figure 9:
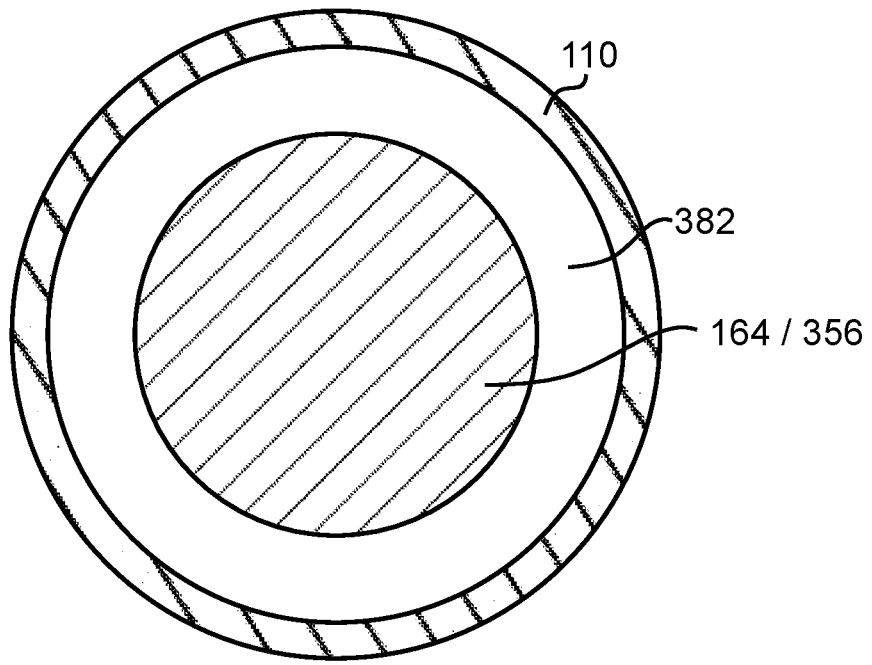
FIG. 9 is a cross-section of the energy harvester of FIG. 7 view along line D-D.

A first electrical contact, such as a first conductive layer (154), is coupled to the first central portion (1522) of the first triboelectric layer (152). A second electrical contact, such as a second conductive layer (164), is coupled to the second central portion (1622) the second triboelectric layer (162). A second area of contact (356) between the second conductive layer (164) and the piezoelectric element (380) may be formed (FIG. 9). The second area of contact (356) may be substantially dependent on an area of the second conductive layer (164) contiguous with the second central portion (1622). The second conductive layer (164) may be configured to be more stiff or more rigid relative to the second triboelectric layer (162). In such cases, the area of the second conductive layer (164) determines the second area of contact (356) between the second conductive layer (164) and the piezoelectric element (380). Alternatively, the second conductive layer (164) may be configured to be a relatively flexible conductive tape. As an example, each of the first conductive layer (154) and the second conductive layer (164) may be a metallic tape such as a copper tape. The area of contact between the second conductive layer (164) and the piezoelectric element (380) may be substantially dependent on a geometry of the magnet (130). For example, the second area of contact (356) may depend on a contact surface (132) of the magnet (130) or a cross section of the magnet (130). This may be the case where the magnet (130) displaces both the first triboelectric layer (152) and the second triboelectric layer (162) to apply pressure on the piezoelectric element (380).

Conventional hybrid mechanical energy harvesters deliver electrical energy at levels around 0.28 milli-Watts (mW) or even micro-Watts (μW). Considering that a AAA battery used in many electronic devices these days has a capacity of 210 milliAmpere-hour (mAh), conventional hybrid mechanical energy harvesters are clearly inadequate for practical applications. In contrast, experiments demonstrate the viability of using energy harvesters of the present disclosure to harvest energy at a level suitable for charging portable power banks or powering electronic devices. Details such as the dimensions given here are solely to aid understanding and are in no way intended to be limiting. Referring to FIG. 1, the energy harvester used in the experiments is configured with a first lateral gap (G1) of approximately 1 millimeter (mm) between the magnet (130) and the housing (110). A magnet-coil separation (G2) between the magnet (130) and the coil (120) is approximately 1.5 mm. The coil may be a copper wire wound about the housing. The first lateral gap (G1) may be sized to allow the magnet (130) to move freely substantially parallel to the longitudinal axis (90). The configuration of the energy harvester is sufficiently robust such that the energy harvester is also operable even if the first lateral gap (G1) permits a relatively small amount of lateral movement by the magnet. The smaller the magnet-coil separation (G2), the stronger the magnetic field cutting the coil (120). While it is preferred to configure the magnet-coil separation (G2) to be as small as possible, the energy harvester is robust enough to be operable when the magnet-coil separation is not configured to be the smallest possible dimension. The magnet-coil separation (G2) may be up to and including 2 mm in some examples. In the experiments, the energy harvester has a substantially cylindrical housing (110) with a height (H) of about 6 centimeters (cm) and a diameter (D) of about 2.5 cm. The second member (160) is fixed to a distal end (116) of the housing (110). The first member (150) is supported at a gap width (70) of no more than a few millimeters from the second member (160). The magnet (130) and the biasing member (140) are configured to permit the magnet (130) to undergo a displacement (92) that is about one order of magnitude larger than the gap width (70). The volume of the energy harvester is 29.45 cubic centimeters (cm$^3$). The housing (110) of the energy harvester is not limited to a substantially closed cylindrical. The energy harvester may be shaken by hand at a frequency of 4 to 5 Hertz (Hz) to simulate typical human activities. A biasing member (140) with a spring constant close to 30 Newton per metre (N/m) may be used. In some applications, the spring constant is preferably approximately in a range from 20 N/m to 50 N/m. The biasing member (140) may be one configured with a resonant frequency close to 2.7 Hz, so that there is little damping and is suitable for harvesting energy from human activities (including human motion).

Figure 10A:
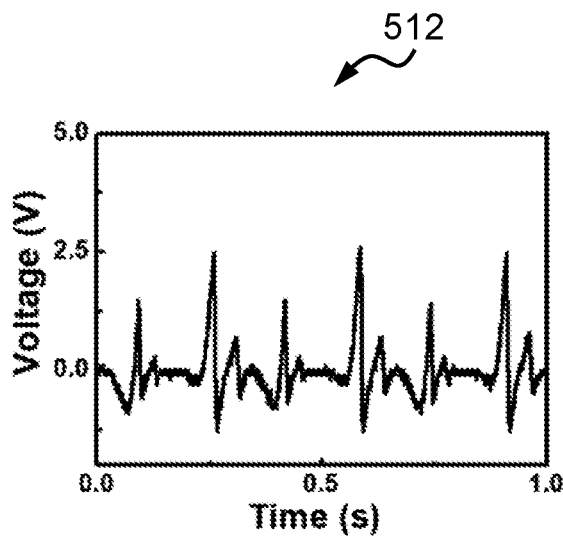
FIG. 10A and FIG. 10B illustrate the voltage output corresponding to different number of turns in the coil of the electromagnet.
Figure 10B:
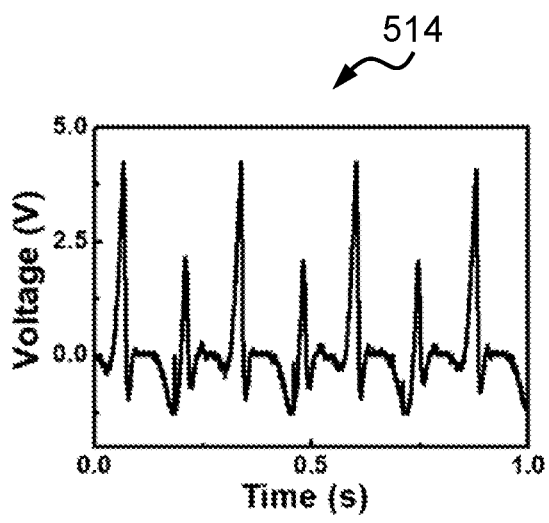

FIG. 10A and FIG. 10B are plots of voltage output over time of the electromagnet (102) according to the energy harvester (100) according of FIG. 1. Plot 512 (FIG. 10A) shows that a voltage output of about 2.5 V is achievable with 500 turns of copper wire in the coil of the electromagnet. Plot 514 (FIG. 10B) shows that with a coil of 1500 turns, the voltage output of the electromagnet is around 5.0 V. This number of turns in the coil further corresponds to an energy harvester that is physically relatively small enough to be portable or mobile, but yet is capable of harvesting as much as three orders of magnitude more energy than a conventional hybrid mechanical energy harvester.

Figure 11A:
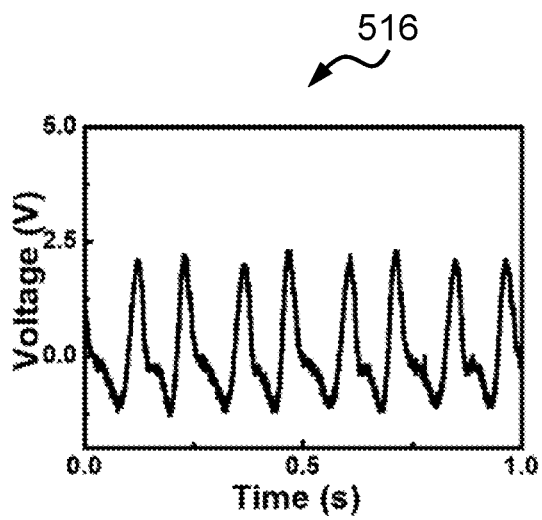
FIG. 11A and FIG. 11B illustrate the voltage output corresponding to different magnetic field strengths.
Figure 11B:
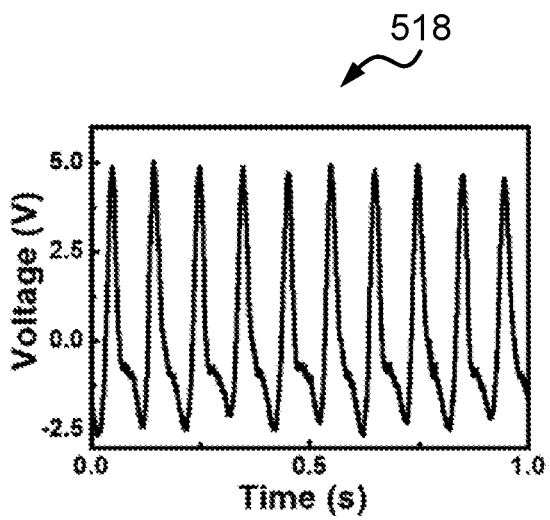

FIG. 11A and FIG. 11B are plots of voltage output over time of the electromagnet (102) according to the energy harvester (100) of FIG. 1. Plot 516 (FIG. 11A) shows that a voltage output of about 2.5 V is achievable at a magnetic field of about 0.2 Tesla (T). As shown in plot 518 (FIG. 11B), using a slightly stronger magnet such as one characterized by a magnetic field of 0.7 T doubles the voltage output to about 5.0 V. This again demonstrates the viability of using the energy harvester of FIG. 1 in practical real-life applications.

Figure 12A:
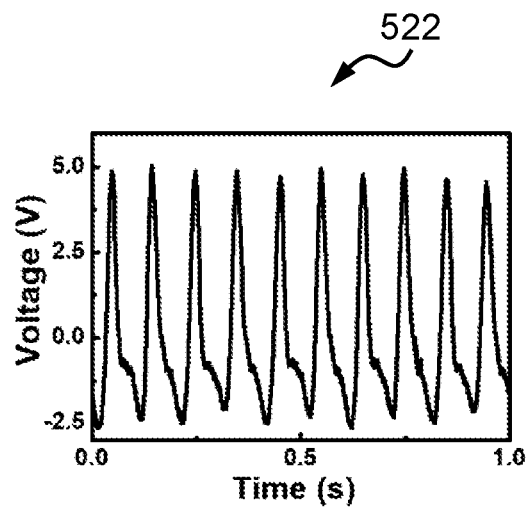
FIG. 12A and FIG. 12B illustrate the voltage and current output according to one example.
Figure 12B:
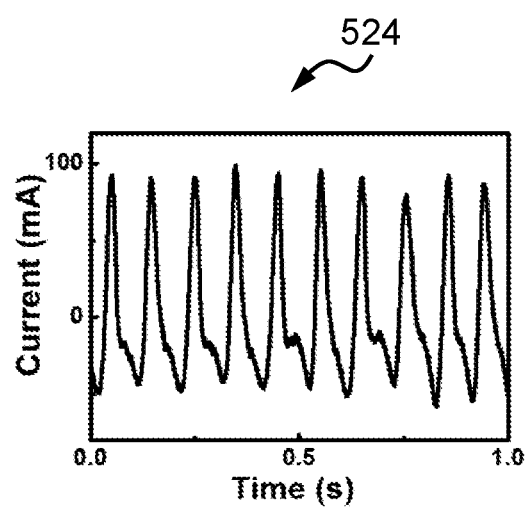
Figure 13A:
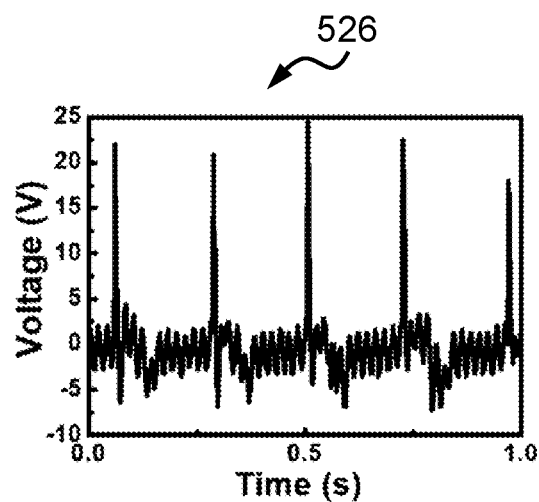
FIG. 13A and FIG. 13B illustrate the voltage and current output according to another example.
Figure 13B:
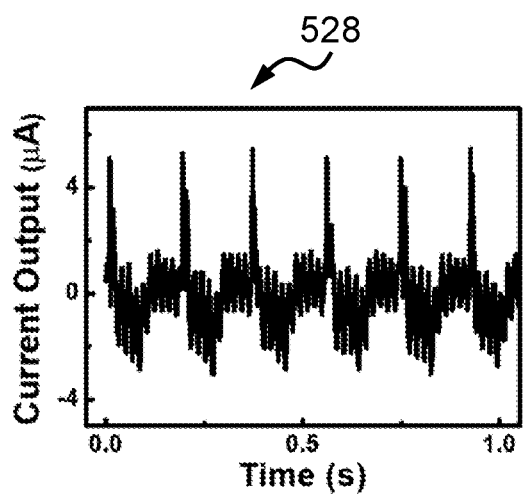

FIG. 12A is a plot of voltage output over time, and FIG. 12B is a corresponding plot of current output over time, of the electromagnet (102) according to the energy harvester according of FIG. 1. Plot 522 (FIG. 12A) shows that the voltage output obtainable from the electromagnet (104) is around 5 V. Plot 524 (FIG. 12B) shows that the corresponding current generated is close to 100 milli-Amperes (mA) at a magnetic field strength of 0.7 T. Plot 526 (FIG. 13A) and plot 528 (FIG. 13B) show the voltage output (about 20 V) and the current output (about 6 µA) from the triboelectric nanogenerator (102) according to the energy harvester (100) of FIG. 1. Overall, the energy harvester delivers a power output of 0.5 watts (W) which is equivalent to a power density of 0.016 watts per cubic centimeter (W/cm$^3$). At such a performance level, close to 0.5 watts (W) of power is generated. This means that the energy harvester of FIG. 1 can be configured to harvest enough energy to charge as much as 50% of an AAA battery from just one hour of normal walking or normal human activity. Embodiments of the present disclosure are also capable of charging 10% of a 1200 mAh battery with one hour of normal walking. The 1200 mAh battery is typically used in global positioning satellite (GPS) navigation systems and action cameras, and the ability to charge such devices on-the-go can be a game changer. The energy harvester of the present disclosure clearly demonstrates its potential for harvesting energy at required levels of efficiency.

Figure 14:
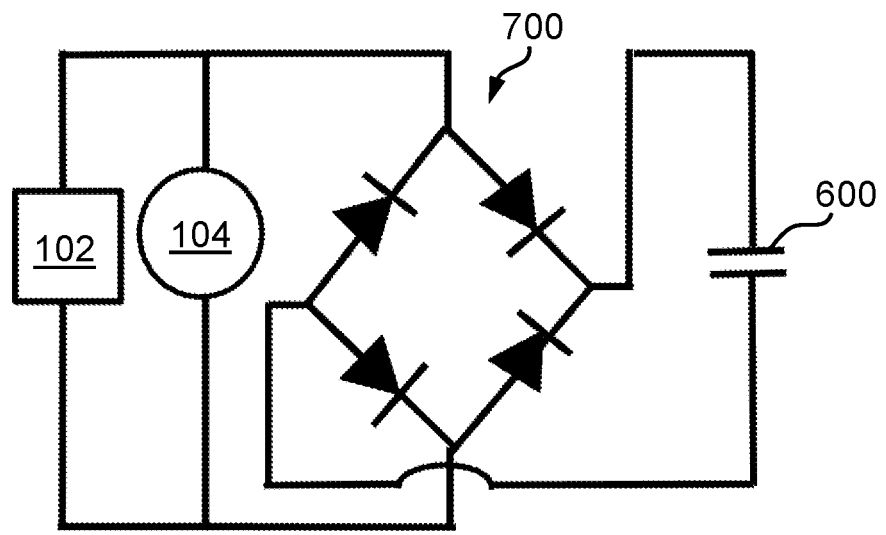
FIG. 14 is a schematic circuit according to one embodiment of the energy harvester.
Figure 15:
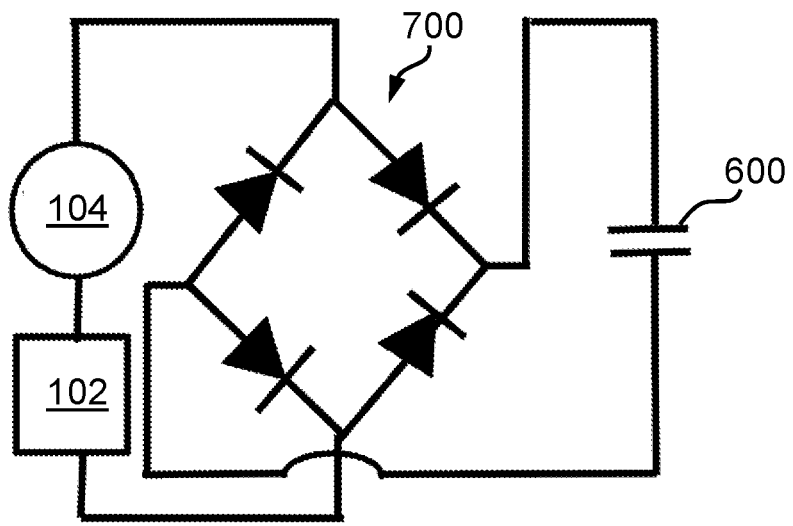
FIG. 15 is a schematic circuit according to another embodiment.
Figure 16A:
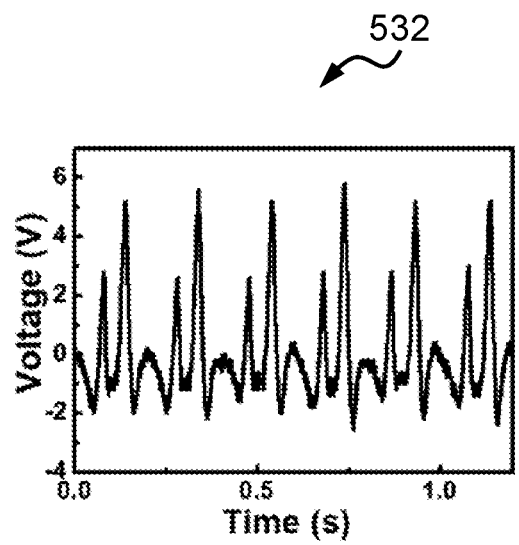
FIG. 16A and FIG. 16B illustrate example voltage and current output from an electromagnetic generator electrically connected in parallel to a triboelectric nanogenerator according to an embodiment.
Figure 16B:
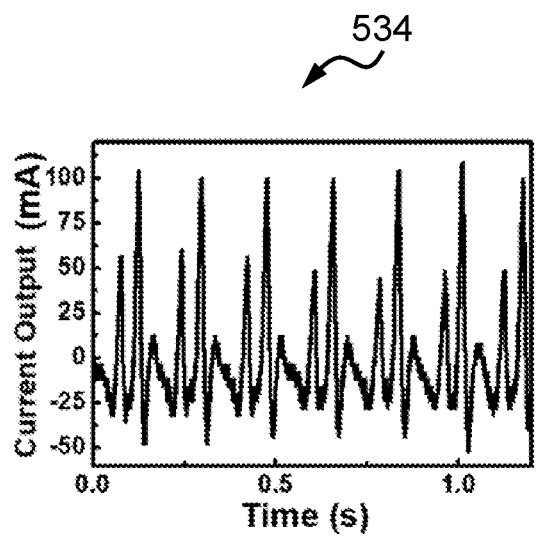
Figure 17A:
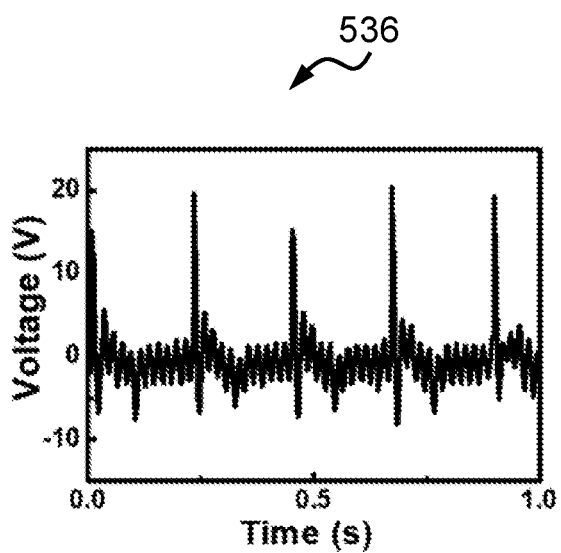
FIG. 17A and FIG. 17B illustrate example voltage and current output from an electromagnetic generator electrically connected in series to a triboelectric nanogenerator according to an embodiment.
Figure 17B:
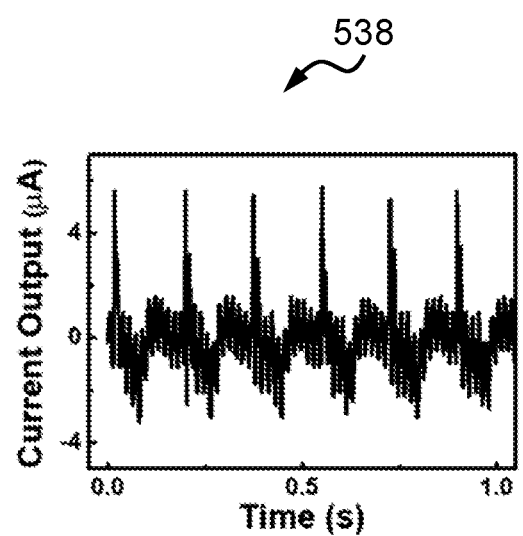

According to embodiments of the present disclosure, the electrical output from the electromagnet (102) and the electrical output from the triboelectric nanogenerator (104) may be variously configured. For example, as shown in FIG. 14, the coil of the electromagnet may be electrically connected to the first member (150) and the second member (160) of the triboelectric nanogenerator (104) respectively, such that the electromagnet (102) and the triboelectric nanogenerator (104) are electrically connected in parallel. In such configurations, the electromagnet (102) is seen to dominate the output, generating a relatively low voltage (plot 532 of FIG. 16A) and high current (plot 534 of FIG. 16B). Alternatively, as shown in FIG. 15, the coil of the electromagnet (102) may be electrically connected to the first member (150) and the second member (160) of the triboelectric nanogenerator (104) respectively, such that the electromagnet (102) and the triboelectric nanogenerator (104) are electrically connected in series. In such configurations, the triboelectric nanogenerator (104) is seen to dominate the output, generating a relatively high voltage and low current. The corresponding voltage output of the energy harvester is illustrated by plot 536 of FIG. 17A, and the corresponding current output is illustrated by plot 538 of FIG. 17B.

Figure 18:
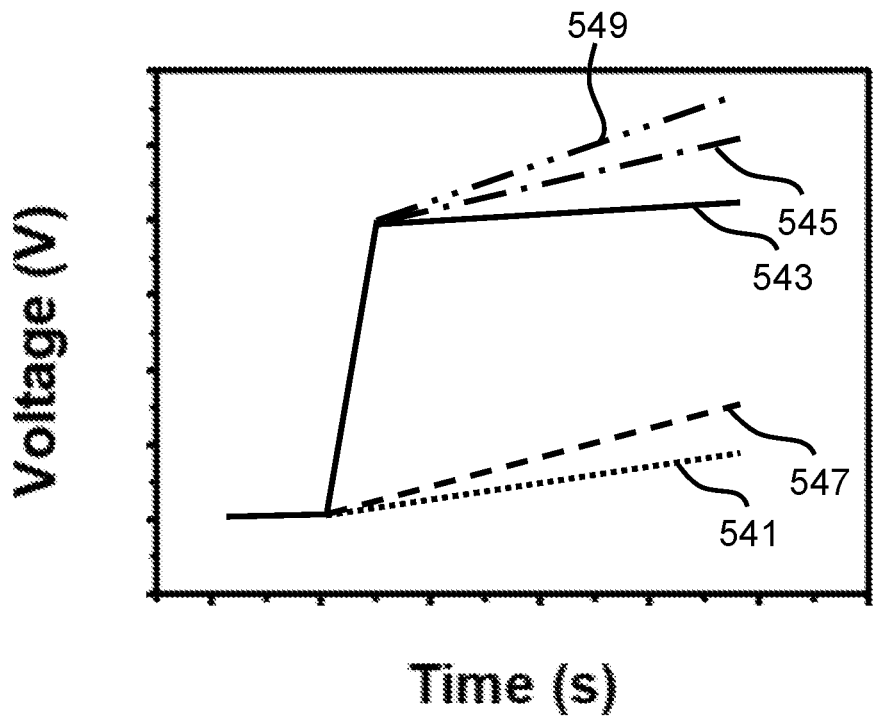
FIG. 18 illustrates the comparative rate at which energy can be harvested.

FIG. 18 are plots of voltage over time, illustrating the comparative rate at which energy can be harvested and the amount of energy that can be harvested. Plot 545 is based on the electrical output of an energy harvester configured according to the embodiment of FIG. 1. In the experiments, the electromagnet (102) and the triboelectric nanogenerator (104) were connected in parallel, and power generated by the energy harvester (100) was stored in a 450 µF (microfarad) capacitor when the energy harvester (100) was shaken by hand at a frequency of 4-5 Hz. The total output includes contribution from the triboelectric nanogenerator (plot 541) as well as contribution from the electromagnet (plot 543). The plot 545 shows that a relatively high charging voltage (equivalent to the amount of energy that can be harvested) is achievable in part because, unlike conventional hybrid energy harvesters, embodiments of the present disclosure provide integration of the electromagnet with a triboelectric nanogenerator that does not constrain the amount of energy that can be harvested by the electromagnet. It was observed that the capacitor was rapidly charged to a high voltage. In fact, the current density was sufficiently high to charge the capacitor up to 4 V within the first 10 seconds (s). The total voltage across the capacitor eventually reached beyond 4 V. After 100 s, it was observed that the energy harvester could harvest 6% more total energy density, compared with a conventional electromagnet harvester. Plot 549 illustrates that the energy harvesting performance can be further boosted using an energy harvester according to the embodiment of FIG. 7, for example, with aid of a charge pump. Plot 547 shows that the effect of the charge pump includes increasing the contribution from the triboelectric nanogenerator, without negatively impacting the energy contribution obtainable from the electromagnet or affecting the rapid charging enabled by the electromagnet.

Figure 19:
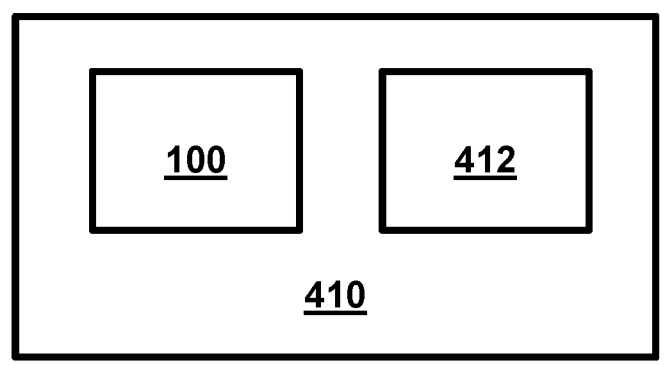
FIG. 19 illustrates a schematic block diagram of a portable power bank according to one embodiment.

FIG. 19 is a schematic block diagram of a portable power bank (410). The portable power bank (410) includes an energy harvester (100) according to any of the embodiments described above and an energy storage device (412) electrically connected to the energy harvester (100). When the portable power bank (410) is subjected to movement, the energy harvester (100) is configured to convert movement of the portable power bank (410) into an electrical output and the energy storage device (412) is chargeable by the electrical output from the energy harvester (100).

Figure 20:
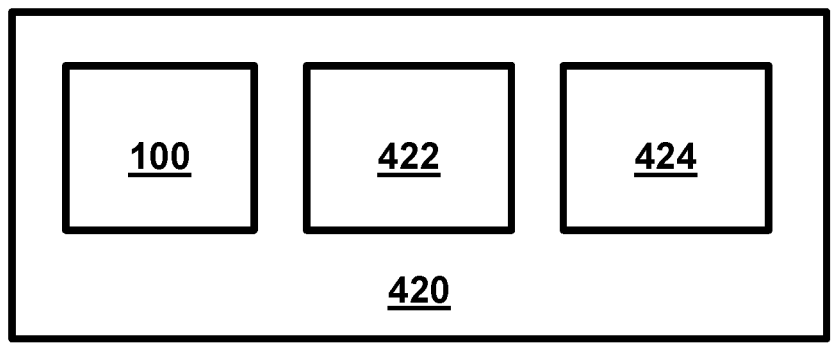
FIG. 20 illustrates a schematic block diagram of a wearable product according to one embodiment.

FIG. 20 is a schematic block diagram of a wearable product (420). The wearable product (420) includes a wearable component (422) coupled to an energy harvester (100) according to any of the embodiments described above. Non-limiting examples of a wearable component (422) include articles of clothing, bags, accessories, other portable items generally suitable or intended to be attachable, carried, worn or otherwise held by/to a moveable object or a person. Non-limiting examples of a wearable component (422) include straps, wrist bands, arm bands, detachable couplings, hooks, fasteners, etc. The wearable product (420) may also include an electronic device (424) electrically connectable with the energy harvester (100). The magnet (130) of the energy harvester (100) is displaceable in response to movement of the wearable component (422) such that movement of the wearable component (422) is converted into an electrical output of the energy harvester (100). The electronic device (424) is operable by drawing on the electrical output of the energy harvester (100).

Figure 21:
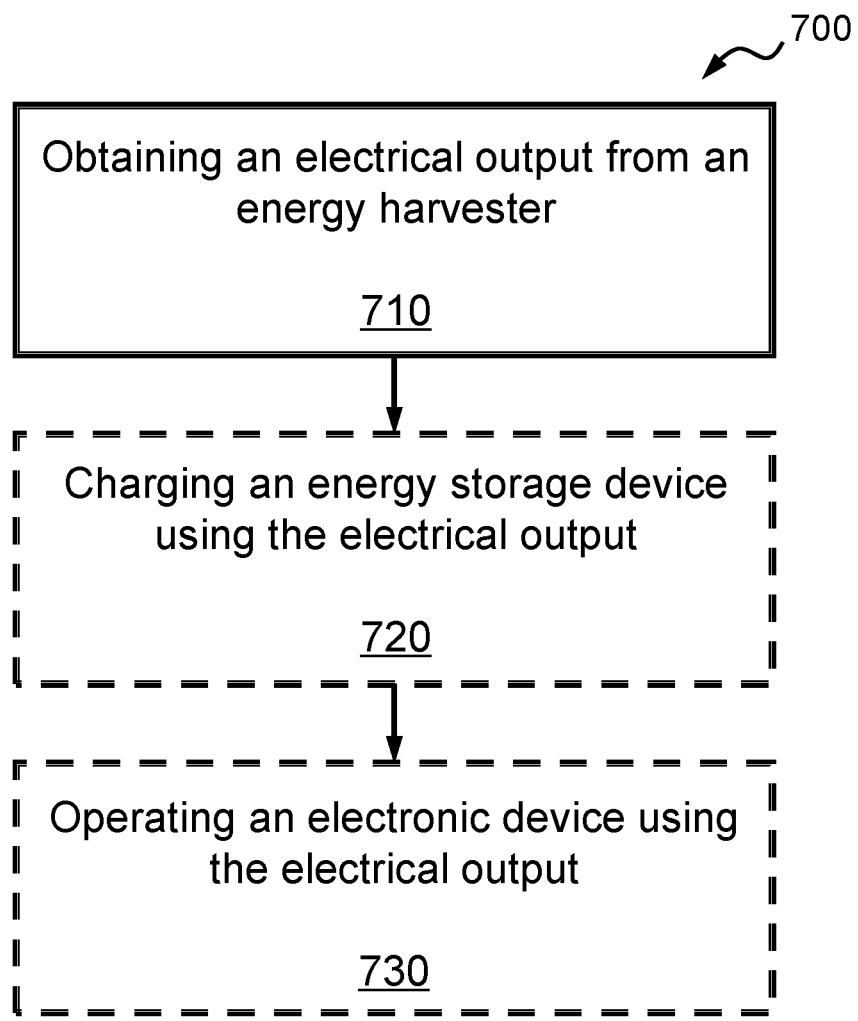
FIG. 21 illustrates a method of harvesting energy according to embodiments of the present disclosure.

FIG. 21 schematically illustrates a method (700) of harvesting energy from motion of a body. The method 700 includes obtaining (710) an electrical output from an energy harvester (100) according to any of the embodiments described above. The electrical output includes a contribution from the electromagnet (102) and a contribution from the triboelectric nanogenerator (104), in which the triboelectric nanogenerator is coupled with the electromagnet. The energy harvester (100) is configured to be wearable by the body such that relative motion between the magnet and the coil is energized by the motion of the body. The term "wearable by the body" refers generally to the energy harvester being attachable, carried, worn or otherwise held. The body may be a living thing (such as a person) or an object that is likely to be in motion (such as vehicles, bags, etc.).

The method (700) may further include charging (720) an energy storage device (412) using the electrical output from the energy harvester (100) according to any of the embodiments described above, in which the energy storage device is electrically connected to the energy harvester. Optionally, the method (700) includes operating (730) an electronic device (424) using the electrical output from an energy harvester (100) according to any of the embodiments described above, in which the electronic device is electrically connected to one or both of the energy harvester (100) and the energy storage device (412).

Kinetic energy associated with human activities is one example of ambient energy. To be of practical use, whether for the purpose of powering consumer electronics or vehicles, it is not enough to simply be able to harvest ambient energy if the amount of useable energy is too little. For example, conventional electromagnetic-triboelectric nanogenerators provide electrical energy in the neighborhood of micro-Watts (μW) or milli-Watts (mW). Another challenge is that common human activities such as walking are associated with relatively low vibrational frequencies, typically less than 2 Hz. One conventional laboratory set-up is known to be functional at a relatively high frequency of 23.5 Hz and generates only 0.28 mW, which is not really practical for powering many electronic devices (typically powered by a AAA battery having a capacity of 210 mAh). It can therefore be appreciated that the present disclosure addresses the need for a method and device for energy harvesting, and for products powered by the hybrid energy harvester. In particular, the method and device for energy harvesting of the present disclosure have been demonstrated to be suitable for harvesting ambient energy. More specifically, the method and device are for suitable for, but not limited to, harvesting ambient energy, such as kinetic energy associated with human activities.

Furthermore, the described features, structures, or characteristics may be combined in any suitable manner in one or more embodiments. In the description, numerous specific details are provided to give a thorough understanding of embodiments. One skilled in the relevant art will recognize, however, that the various embodiments can be practiced without one or more of the specific details, or with other methods, components, materials, etc. In other instances, some or all known structures, materials, or operations may not be shown or described in detail to avoid obfuscation.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. An energy harvester comprising:
an electromagnet including a magnet and a coil, the electromagnet being configured to enable relative motion between the magnet and the coil; and
a triboelectric nanogenerator coupled to the electromagnet, the triboelectric nanogenerator having a first member and a second member, the first member and the second member being configured to be spaced apart by a gap width, wherein the gap width is smaller than a displacement of the magnet, the displacement enabling at least a part of the first member to contact at least a part of the second member.

2. The energy harvester of claim 1, wherein the relative motion comprises a reciprocating motion along a longitudinal axis, enabling the magnet to push the first member towards contacting the second member, and alternately enabling the magnet to separate from the first member.

3. The energy harvester of claim 2, further comprising a housing, the housing being fixed to the coil and resiliently coupled to the magnet to provide the relative motion in response to movement of the housing.

4. The energy harvester of claim 3, further comprising a biasing member, wherein the magnet is resiliently coupled to the housing via the biasing member, the biasing member being configured to primarily deform elastically along the longitudinal axis, wherein the magnet is oriented with its magnetic axis substantially parallel to the longitudinal axis.

5. The energy harvester of claim 4, wherein a portion of the first member and a portion of the second member are coupled to one another such that the portion of the first member and the portion of the second member are substantially stationary relative to the housing.

6. The energy harvester according to claim 5, wherein the first member comprises a first triboelectric layer, the first triboelectric layer having a first peripheral portion substantially circumscribing a first central portion, and wherein the second member comprises a second triboelectric layer, the second triboelectric layer having a second peripheral portion substantially circumscribing a second central portion, and wherein the first central portion is resiliently displaceable relative to the first peripheral portion to enable an area of contact between at least a part of the first central portion and at least a part of the second central portion.

7. The energy harvester of claim 6, further comprising a separator disposed between the first peripheral portion and the second member, wherein the gap width is defined by a thickness of the separator.

8. The energy harvester of claim 6, further comprising a first conductive layer coupled to the first triboelectric layer, wherein the area of contact is substantially dependent on an area of the first conductive layer contiguous with the first central portion.

9. The energy harvester of claim 8, wherein the area of contact is smaller than or substantially equal to the area of the first conductive layer.

10. The energy harvester of claim 2, wherein the coil is wound about a longitudinal axis, the coil having a solenoid length at least substantially equal to the displacement of the magnet along the longitudinal axis.

11. The energy harvester of claim 1, further comprising a charge pump coupled to the triboelectric nanogenerator, wherein the charge pump is configured to contribute to a charge density of at least one of the first member and the second member.

12. The energy harvester of claim 11, wherein the charge pump is configured to deliver a unidirectional flow of charges to at least one of the first member and the second member.

13. The energy harvester of claim 12, wherein the charge pump comprises a piezoelectric element, the piezoelectric element being disposed proximal the second member, such that the piezoelectric element is configured to contribute charges in response to pressure resulting from contact between the first member and the second member.

14. The energy harvester of claim 13, wherein the second member is configured to apply pressure on the piezoelectric element.

15. The energy harvester of claim 13, wherein the second member is resiliently displaceable such that the magnet in the reciprocating motion intermittently pushes the first member and the second member against the piezoelectric element.

16. The energy harvester of claim 11 configured to provide an electrical output, wherein the electrical output includes a contribution from the triboelectric nanogenerator and a contribution from the electromagnet respectively.

17. The energy harvester of claim 11, configured to provide an electrical output, wherein a contribution from the triboelectric nanogenerator comprises a contribution from the charge pump.

18. A wearable product comprising:
a wearable component; and
an energy harvester according to claim 1 coupled to the wearable component, wherein the magnet is displaceable in response to a movement of the wearable component such that the movement of the wearable component is converted into an electrical output of the energy harvester; and
an electronic device electrically connectable with the energy harvester such that the electronic device is operable by drawing on the electrical output of the energy harvester.

19. A method of harvesting energy from motion of a body, the method comprising:
obtaining an electrical output from an energy harvester according to claim 1, the electrical output including a contribution from the electromagnet and a contribution from the triboelectric nanogenerator coupled with the electromagnet, wherein the energy harvester is configured to be wearable by the body such that relative motion between the magnet and the coil is energized by the motion of the body.

20. The method of claim 19, further comprising:
operating an electronic device using the electrical output from the energy harvester, the electronic device being electrically connected to one or both of the energy harvester and an energy storage device, wherein the energy storage device is electrically connected to the energy harvester such that the energy storage device is configured to be chargeable by the electrical output.

\* \* \* \* \*